No. 683,552. Patented Oct. 1, 1901.
J. CALDWELL.
HORSE HITCHING DEVICE.
(Application filed Jan. 18, 1901.)
(No Model.)
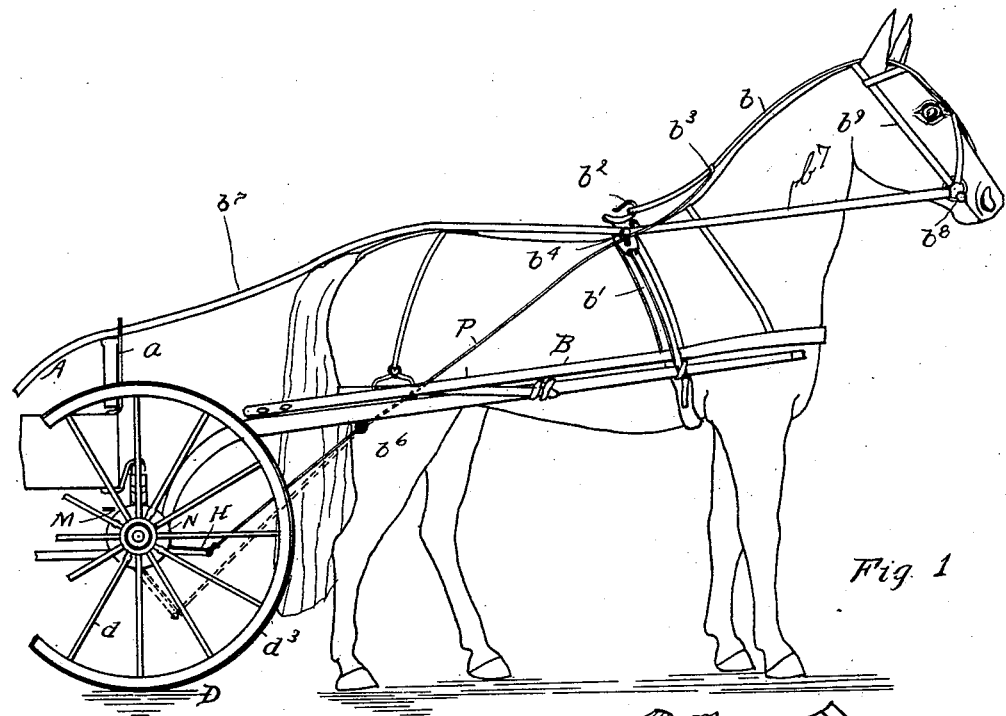
Fig. 1
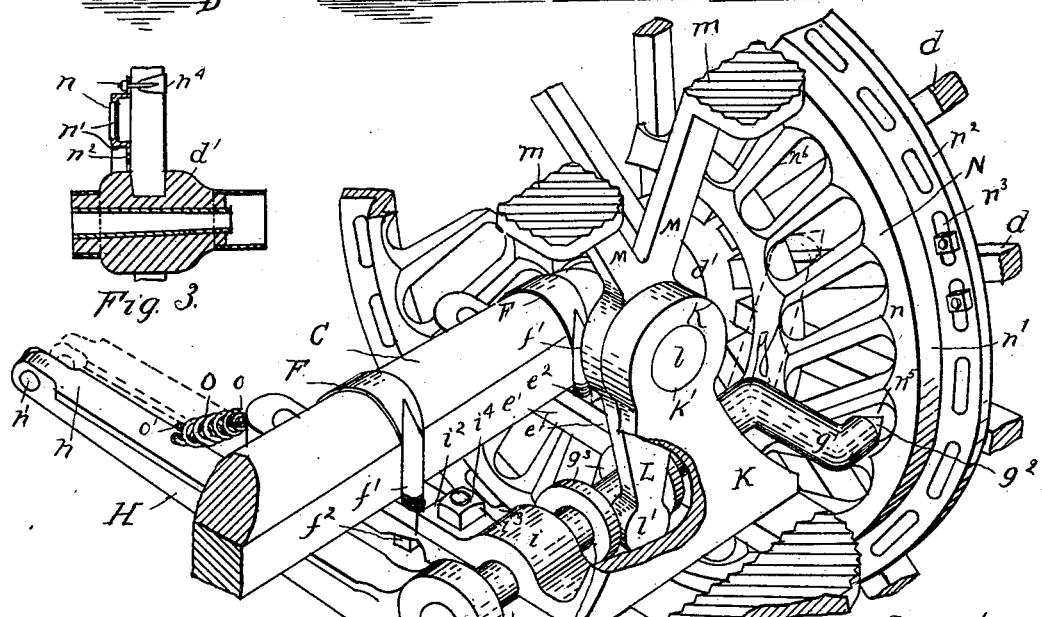
Fig. 3.
Fig. 2.
Witnesses
Frances A. Leach
Annie D. Greer.
Inventor
Jack Caldwell
By Rich H. Manning Atty.
THE NORRIS PETERS CO., PHOTO-LITHO., WASHINGTON, D. C.

UNITED STATES PATENT OFFICE.

JACK CALDWELL, OF KANSAS CITY, MISSOURI, ASSIGNOR OF ONE-HALF TO ELMER G. EGE, OF SAME PLACE.

HORSE-HITCHING DEVICE.

SPECIFICATION forming part of Letters Patent No. 683,552, dated October 1, 1901.

Application filed January 18, 1901. Serial No. 43,778. (No model.)

*To all whom it may concern:*

Be it known that I, JACK CALDWELL, a citizen of the United States of America, residing at Kansas City, in the county of Jackson and State of Missouri, have invented certain new and useful Improvements in Horse-Hitching Devices; and I do hereby declare that the following is a full, clear, and exact description of the invention, such as will enable others to make and use the same, reference being had to the accompanying drawings, forming a part of this specification.

The objects of my invention are, first, to control the restive and forward movements of an animal harnessed to a vehicle and prevent accidents from sudden starts and disposition to run, and, second, to apply the means of control with the exercise of gradual degrees of force automatically and independently of the driving-reins.

The invention consists in the novel construction and combination of parts, such as will be first fully described, and specifically pointed out in the claims.

In the drawings, Figure 1 is a side view of the forward portion of a vehicle, showing the shafts and the animal harnessed thereto, also showing the devices upon the front axle connected with the checkrein leading to the head of the animal. Fig. 2 is a detail broken view, enlarged, of the front axle and the nigh wheel of the vehicle, showing the novel coacting devices controlling the animal on the wheel and axle. Fig. 3 is a sectional view of the hub and disk.

Similar letters of reference indicate corresponding parts in all the figures of the drawings.

Referring to the drawings, A represents the vehicle, and B the shafts, to which the animal is harnessed.

C represents the front axle, and D the front right wheel, to which the grooved disk hereinafter described is conveniently attached.

E represents a step, upon which the right foot of the person in mounting or alighting from a vehicle is commonly placed, and in this instance consists of a horizontal plate $e$ of the width of the person's foot arranged in position in rear of and in the plane of the under side of the axle C and a short distance from the inner side of the hub of wheel D. The upper side of the plate $e$ is corrugated, and with the inner side of the plate $e$ is connected separate extensions $e'$ $e'$, narrow in width, which pass close in position and on the under side of the axle C and a short distance beyond the vertical plane of the front side of said axle. The extensions $e'$ $e'$ are perforated on each side of the said axle, as at $e^2$. Extending downwardly on each side of the axle C are U-shaped fastening devices or clips F F, the ends $f$ $f$ of which are screw-threaded and pass through the perforations $e^2$ $e^2$ in each of the forward extensions $e'$ $e'$ of the plate $e$, and a short distance below the under side of said extensions and upon said ends are fitted the nuts $f^2$, which secure the said extensions $e'$ firmly to the axle.

In the upper side of the extensions $e'$ $e'$ at a point equidistant from the plate $e$ and axle C are curved depressions $e^4$ $e^4$, extending transversely to said extensions, which form shaft-bearings, and in said bearings is mounted a crank-shaft G, one end $g$ of which shaft extends beyond the outer side of one extension $e'$, which is opposite the hub of wheel D and is bent at right angles to said shaft and extended normally in the plane of step $e$ a short distance from the shaft and the extreme end $g'$ bent at right angles and extended a slight distance in the direction of the wheel D, the sides of said end $g'$ being inclined to a point, as at $g^2$. The other end of crank-shaft G extends a short distance from the outer side of the other extensions $e'$ in the direction of the under side of the wheel A, and upon said end of the shaft is rigidly connected one end of arm or lever H, the other end of which extends forwardly beneath the axle C a considerable distance and in an opposite direction to the position of the bent portion of shaft G. In the end $h$ of lever or arm H is a transverse opening $h'$. Upon crank-shaft G, between the shaft-bearings $e^4$ $e^4$ in the extensions $e'$ $e'$ of plate $e$, are separate rigidly-connected collars $g^3$ $g^3$ and arranged a short distance from each other and said shaft-bearings.

Upon the upper side of the extensions $e'$ $e'$ are the cap-plates $i$ $i$, which extend in a curved line over the shaft G and retain said shaft in the bearings $e^4 e^4$. The inner ends $i^2 i^2$ of the cap-plates $i\ i$ extend a short distance in the horizontal plane of the plates $i'\ i'$ toward the axle C and are secured to said plates by the screw-bolts $i^3 i^3$, which extend upwardly from the plates $e'\ e'$ through the said portions $i^2 i^2$, and upon said bolts are securing-nuts $i^4$. The outer ends of the cap-plates $i\ i$ extend in the horizontal plane of the plates $e'\ e'$ nearly to the plate $e$, and with the said ends is connected rigidly the lower end of a vertical plate or standard K, which extends in a transverse direction to the extensions $e'\ e'$. The upper end of plate K extends in height a short distance above the horizontal plane of the upper side of the axle C, and the outer edges of said plate incline inwardly and connect with the circular upper end portion $k$, through which portion extends a circular opening $k'$.

Upon the inner side of the plate K, toward the axle C, is a vibrating flat plate or arm L, the upper end of which arm is semicircular in form, and upon the inner side is a pivot $l$, which extends through the opening $k'$ in the standard K. The lower end of the arm L extends downwardly between the separate collars $g^3 g^3$ and is gradually decreased in width, and upon said lower end is a curved knob $l'$, which alternately contacts with said collars $g^3 g^3$. With the upper end of the arm L are rigidly connected the lower ends of separate bars M M, which extend upwardly a short distance in radial lines to the axis of the arm L, and upon the upper ends of said bars are rigidly connected the foot-plates $m\ m$, which extend at right angles to said bars and in a plane horizontal with the step $e$, the upper surfaces of which foot-plates are corrugated, as seen in the drawings.

Upon the inner side of wheel D, adjacent to the portion of shaft G and secured to the spokes $d$ of said wheel, is a circular disk N, which is concentric with the hub $d'$ of said wheel. Said disk consists of an annular face $n$, which extends in width from a position a short distance from the hub $d'$ in the direction of the rim $d^3$ of the wheel a short distance beyond the radius of the end $g'$ of shaft G. From the inner side of the face $n$ extend the annular plates $n'\ n'$, the outer edges of which are bent outwardly at right angles to form flanges $n^2 n^2$, which come into contact with the spokes $d$ of wheel D. In the flanges $n^2 n^2$ are longitudinal slots or openings $n^3$, made in series a short distance apart in the direction of the annular face of the disk. Through the slots or openings $n^3$ pass the clips $n^4$, which are extended around each spoke, not only securing the disk to the wheel, but conforming the disk to the disk of the spokes $d$. Extending through the face $n$ of the disk N are the grooves $n^5$, which also extend from the inner circumference to the outer circumference in oblique lines, and the sides of which grooves are spaced, so as to admit the end $g^2$ of the crank-shaft G. In order to effect a compulsory entrance of the end $g^2$ of said shaft upon the portions of the disk between the grooves and parallel with the sides of said grooves are longitudinal ribs $n^6$, extending above the plane of the face $n$ of the disk, the side of each rib inclining inwardly and meeting at a point. With the forward end of one of the extensions $e'$ of the plate $e$, adjacent to the lever H, is a pin $o$, which is connected with one end of a coiled spring O, the other end of which spring extends to the lever H and is connected with a hook $o'$ upon the upper side of said lever, whereby the said lever is retained in a normally horizontal position, the spring expanding sufficiently to permit of its full operation.

$b$ represents the ordinary checkrein of the harness, as shown in the drawings, and which, as is well known, operates to hold the head of the animal in an elevated position and which is looped over the check-hook $b^2$ in the saddle $b'$. At the point $b^3$, from which the checkrein ordinarily extends in separate parts, is connected one end of a hitching-rein P, the other end of which rein extends through the ring $b^4$ on one side of the saddle $b'$, thence downwardly on the inner side of the shaft B through the loop $b^6$ on the under side of said shaft, and is connected with the opening $h'$ in the outer end of the lever H on the crank-shaft G on the extensions $e'\ e'$ on axle C.

$b^7$ represents the ordinary driving-reins, which are connected with the bits $b^8$ on the head-strap $b^9$, the free ends of the reins being held in any suitable manner upon the dashboard $a$ of the vehicle, so as to be readily seized by the hand in stepping into the vehicle.

In the employment of the invention the person upon whom the control of the horse devolves seizes the reins $b^7$ while upon the ground and upon the right-hand side of the vehicle, placing the right foot upon the step, and enters the vehicle. The position of the crank-shaft G and the lever H when the invention is not in use is that seen in dotted lines in Fig. 2, the crank-arm $g$ being disengaged from the disk N. Upon the sudden start of the horse or from any cause the animal becomes unmanageable with the reins the driver places the right foot upon the corrugated surfaces $m$ of the bars M M and oscillates the said bars laterally, which action throws the arm L forward against one of the collars $g^3$ and moves the crank-shaft in the bearings $e^4$ in the direction of the wheel D, the end $g^2$ of said crank-shaft being forced into one of the series of oblique slots, and consequently from the normal position of the crank at the outer end of said slot. Simultaneously with the forward movement of the horse and the rotation of the wheel D the end $g^3$ of the crank-arm is carried upwardly and forwardly, and as the angle of the slot changes its position in respect to the crank-arm the end $g^2$ of said arm comes into contact with the inner end of the slot, and in about one-fourth of a revolution the wheel is locked to the crank-shaft and the rotation of the wheel impeded. In the same forward movement of the crank-shaft the lever-arm H moves downwardly and rearwardly, as seen in dotted lines, Fig. 1, the spring O yielding as required, drawing firmly upon the hitching-rein P and raising the head of the horse to a high position upward and backward, so as to prevent any vision of the ground and retaining this position until the horse becomes guided and manageable. In the forward movement of the crank-arm as the end of the arm draws nearer the inner end of the slot $n^3$ or toward the axis of the wheel D the degree of force applied to the hitching-rein P is correspondingly relaxed in severity, and while positive in its action it corresponds to the pull on the rein, permits of a gradual application of the power to the head of the horse, and holds him in control. Should, upon the other hand, the braced position of the head cause the horse to move backward, this restive movement causes a partial rotation of wheel D and permits a slack in the hitching-rein P and the head of the horse to regain a natural position, when the lever H comes in contact with the under side of the axle C, and the wheel D remains locked, as before, and the horse meets a resistance to a rearward movement sufficient to check the movement of the vehicle. When the horse becomes manageable, the foot is applied to the bars M, and a forward movement throws the crank-shaft from engagement with the disk N, and the horse is readily driven and wheel D free to turn. In alighting from the vehicle the reins $b^7$ are connected with the dashboard $a$, which prevents the sidewise movement of the head of the animal, and the crank-arm is thrown in engagement with the disk N, and the animal is safely left under the control of the hitching devices and with none of the disadvantages of hitching the animal to a post.

The invention is applicable to all vehicles and is quickly applied without injury to the spokes, the latter being strengthened by the disk N.

If preferred, the vibrating lever L may be pivoted to the axle direct and the crank-shaft moved nearer in position to axle C, doing away with standard K, and such modifications employed as are within the scope of the invention.

Having fully described my invention, what I now claim as new, and desire to secure by Letters Patent, is—

1. The combination with a vehicle, and with the wheel and axle of said vehicle, of a slidable crank-shaft in suitable bearings, upon the axle of the vehicle, having a crank-arm and devices upon the said wheel engaging with said arm, a lever-arm connected with said crank-shaft, and means upon said axle for moving said crank-arm in and out of engagement with the devices upon said wheel.

2. The combination with a vehicle, and with the wheel and axle of a vehicle, of a slidable crank-shaft in suitable bearings upon said axle having a crank-arm, a disk upon the wheel opposite in position to said shaft, having a series of slots therein, means for moving said crank-arm in and out of the slots in said disk, and a lever-arm connected with the crank-shaft.

3. The combination in a hitching apparatus for an animal to be driven with a vehicle, comprising a step-plate upon the forward axle of the vehicle, and a slidable crank-shaft having cranks in suitable bearings upon said plate, and a vibrating arm, a support therefor to which said arm is pivotally connected, an operating-bar connected with said arm, a lever-arm connected with and extending in opposite directions from said crank-shaft to that of the crank, a spring controlling said lever-arm, a checkrein for the head of the animal to be driven, and a hitching-rein connected with said checkrein, and the end of the lever-arm on the crank-shaft.

4. The combination in a hitching apparatus for an animal to be driven, with a vehicle comprising a horizontal step-plate upon the forward axle of the vehicle, and a slidable crank-shaft having a crank-arm in suitable bearings upon said step-plate, separate fixed collars upon said crank-shaft, a standard upon said step-plate, and a vibrating arm pivotally connected at its upper end with said standard and engaging at its lower end with said collars upon said crank-shaft, and an operating-bar connected with said vibrating arm, a disk upon the wheel of the vehicle adjacent to the crank on the crank-shaft, and slots in said disk in oblique lines, adapted to receive the end of said crank, a lever-arm connected with the crank-shaft and extending normally beneath said axle in opposite directions to said crank, an alternately expanding and contracting spring upon said axle connected with the lever-arm, and a hitching-rein connected with the said lever-arm.

5. The combination in a hitching apparatus for an animal to be driven with a vehicle comprising a horizontally-extended step-plate connected with the under side of the front axle of a vehicle and extending rearwardly therefrom, a disk concentric with the hub, having annular sides and annular flanges removably secured to the spokes of the wheel of said vehicle, adjacent to said step-plate and also having oblique grooves, and a slidable locking device upon said step-plate, and means for moving said device in and out of said slots.

JACK CALDWELL.

Witnesses:
 E. G. EGE,
 JOHN T. MARSHALL.